Dec. 19 1922.
J. F. O'CONNOR,
FRICTION SHOCK ABSORBING MECHANISM,
FILED NOV. 12, 1921.
1,439,376
2 SHEETS-SHEET 1
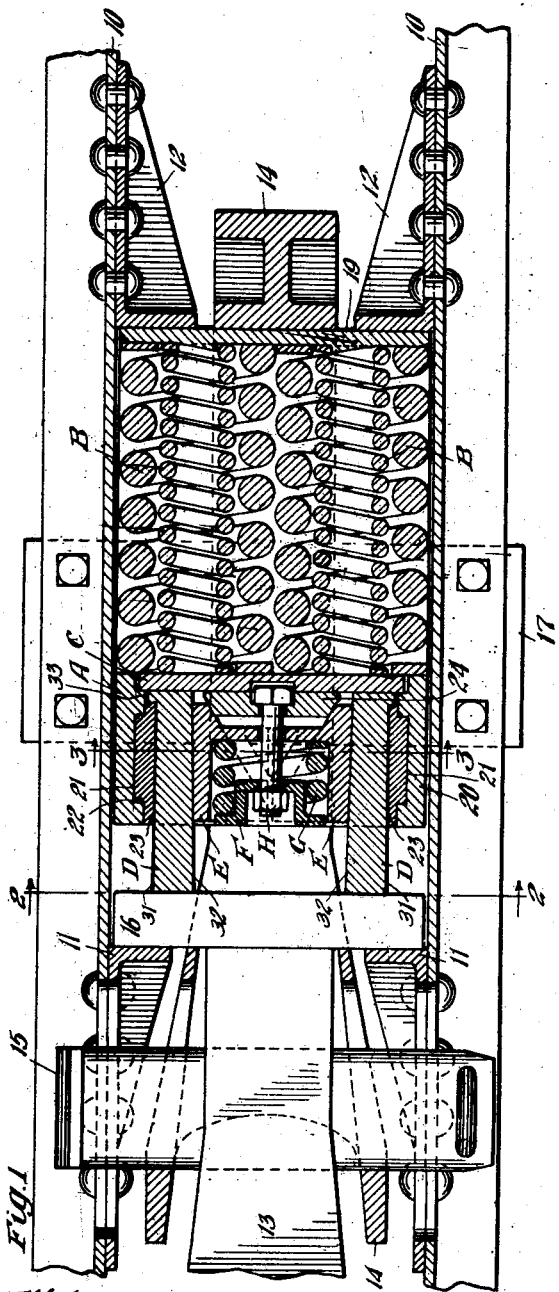
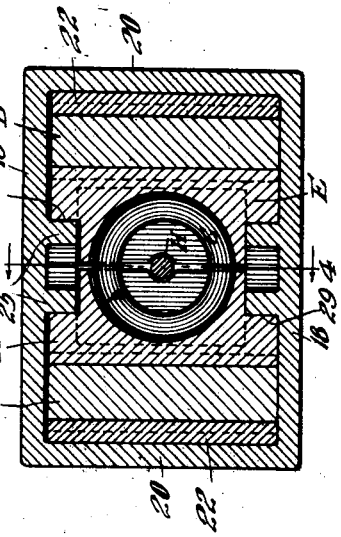
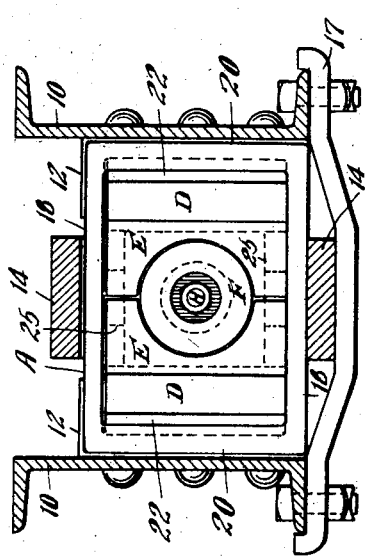
Witnesses
Wm. Geiger
Inventor
John F. O'Connor
By Geo. I. Haight
His Atty.

Dec. 19 1922.
J. F. O'CONNOR,
FRICTION SHOCK ABSORBING MECHANISM,
FILED NOV. 12, 1921.
1,439,376
2 SHEETS-SHEET 2
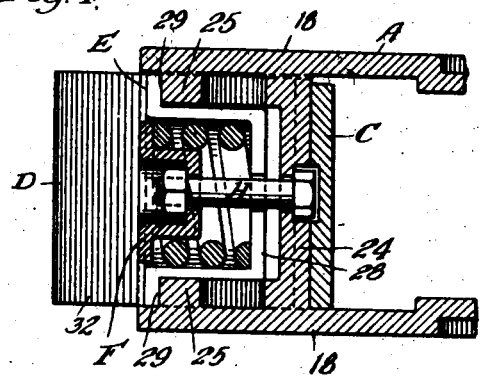
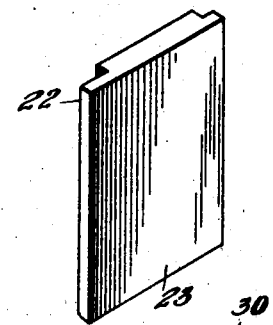
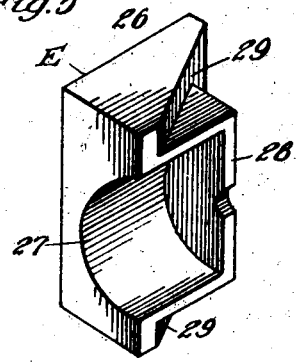
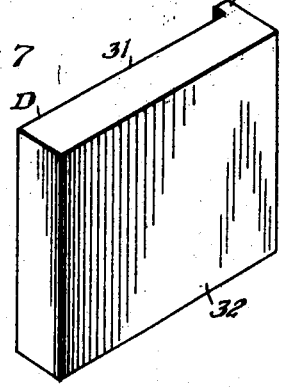
Witnesses
Wm. Geiger
Inventor
John F. O'Connor
By Geo. I. Haight
His Atty.

Patented Dec. 19, 1922.

1,439,376

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed November 12, 1921. Serial No. 514,458.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The main object of the invention is to provide a friction shock absorbing mechanism especially adapted for railway draft riggings wherein are obtained high capacity combined with an easy release.

More specifically, the object of the invention is to provide a friction shock absorbing mechanism wherein are employed friction plungers with a friction gripping arrangement therefor so designed that the gripping effect will be automatically and easily reduced to insure release, when the actuating load is removed from the plungers.

In the drawing forming a part of this specification, Figure 1 is a horizontal, longitudinal, sectional view of a portion of a railway draft rigging showing my improvements in connection therewith. Figures 2 and 3 are vertical, transverse, sectional views corresponding to the lines 2—2 and 3—3 respectively, of Figure 1, Figure 3 being upon an enlarged scale and illustrating the shock absorbing mechanism proper, only. Figure 4 is a broken, longitudinal, vertical, sectional view corresponding substantially to the line 4—4 of Figure 3. Figures 5, 6 and 7 are detail perspectives of one of the friction gripping elements, one of the liners, and one of the friction plungers, respectively.

In said drawings, 10—10 denote channel draft sills of a car underframe to the inner faces of which are secured front stop lugs 11—11 and rear stop lugs 12—12. A portion of a drawbar is indicated at 13, the same being operatively associated with the shock absorbing mechanism proper by a hooded cast yoke 14 and coupler key 15. The shock absorbing mechanism proper, together with the front main follower 16 are disposed within the yoke and the yoke with the parts therewithin is held in operative position by a detachable saddle plate 17.

The improved shock absorbing mechanism proper, as shown, comprises, broadly, a combined friction shell and spring cage casting A; twin arranged main springs B—B; a spring follower C; a pair of friction plungers D—D; a pair of friction gripping elements E—E; an auxiliary spring follower F; an auxiliary spring G; and a retainer bolt H.

The casting A is of generally rectangular hollow box-like form having upper and lower horizontal walls 18—18 united at their rear ends by an integral vertical wall 19 which acts as the rear follower of the mechanism, and side walls 20—20 which are relatively short so as to leave the major portion of the sides of the casting A open to admit of the insertion and removal of the springs and certain of the other parts. At its forward or front end, the casting A has the side walls recessed on their inner faces as indicated at 21—21 to accommodate shouldered friction liner plates 22—22, the latter providing interior longitudinally extending friction surfaces 23—23. It will be noted that the casting A combines a friction shell and spring cage and is adapted to act as a follower and also to transmit load to the sills as a column.

As best shown in Figures 1 and 4, the casting A is provided on the interior thereof with a vertically extending integral wall or partition 24 and forwardly of said partition 24, the upper and lower walls 18 of the casting are provided on their inner sides with forwardly converging wedge-acting ribs 25—25 symmetrically disposed with respect to the center line of the mechanism.

Said wedge ribs 25 are provided to cooperate with the two friction gripping elements E—E, the details of which are best illustrated in Figure 5. Said elements E are of like construction and each is provided on its outer side with a longitudinally extending friction surface 26 and on the inner side with a semi-cylindrical pocket or recess 27 to accommodate the spring G. Near its inner end, each element E is formed with an inwardly extending transverse web or flange 28, said flanges 28 providing rear abutments for the spring G. Above and below the spring pocket provided in each element E, are formed wedge faces 29—29 adapted to engage with the wedge ribs 25.

The spring G is seated at its rear end on the flanges 28 as just described, and its forward end is held by the follower F, the outer face of the latter being approximately flush with the end of the casting A. Said spring follower F is held in position by the retainer bolt H which is anchored at one end to said follower F and at its other end to the partition 24. As will be understood by those skilled in the art, the spring G is under an initial compression and consequently will always tend to force the friction gripping elements E along the wedge ribs 25 in a direction toward the rear or inner end of the casting A, this movement also having an outward or lateral component tending to press the elements E more tightly against the friction plungers D which, as clearly shown in Figures 1 and 4, are interposed between said elements E and the friction liners 22.

Each of the friction plungers D is of heavy plate-like construction of rectangular cross section, each plunger having an outwardly turned shouldered flange 30 at its inner end adapted to engage behind the shouldered inner end of the corresponding liner 22. With this construction, the outward movement of the plungers D is limited with respect to the casting A, as will be understood. In actual practice, the plungers D will be made slightly tapered, the outer friction surfaces 31 thereof which cooperate with the liners 22 extending preferably parallel to the center line of the mechanism, the inner surfaces 32 being inclined slightly outwardly and of course the friction surfaces 26 of the elements E being correspondingly slightly inclined.

The inner ends of the plungers D rest upon the main spring follower C and the latter may also be limited in its outward movement with respect to the casting A by engagement with the partition 24 at its center and by engagement with shoulders 33—33 formed on the interior of the friction shell proper.

The operation is as follows, assuming an inward or buffing movement of the drawbar. As the follower 16 moves inwardly under the buffing movement, the plungers D are moved simultaneously and uniformly therewith. Such movement is of course directly resisted by the main springs B—B acting through the follower C. Inasmuch as the friction gripping elements E are under the influence of the spring G, as heretofore described, the plunger D will be frictionally gripped as the movement of the plungers D continues inwardly. This gripping effect will be automatically augmented as the plungers move inwardly, inasmuch as the frictional drag between the plungers D and the elements E will tend to move the latter still further along the wedge ribs 25. If the plungers D are tapered, as heretofore referred to, there will be a slight outward movement of the friction elements E due to the slight differential action which will be introduced and for this purpose the outer ends of the elements E are normally left within the outer end of the casting A to allow for any slight outward movement of the elements E. At the end of the compression stroke and upon removal of the actuating force, the main springs B will immediately react through the follower C and because of the excess of their capacity as compared with the relatively light spring G, would be enabled to force the plungers D outwardly inasmuch as the friction gripping elements E, even if "frozen" or frictionally stuck to the plungers D, can ride outwardly along the wedge ribs 25 against the action of the light spring G until the pressure on the plungers has been greatly reduced and the frictional grip between the elements E and the plungers broken, the plungers D thereafter moving outwardly without further movement of the elements E. As will be understood by those skilled in the art, the actual amount of outward movement of the elements E will be extremely slight. It will furthermore be noted that the spring G automatically serves to always maintain the elements E taut with the plungers D and thus compensate for any wear on the various friction surfaces.

By employing the two plungers arranged as shown, I am enabled to obtain four sets of friction surfaces of relatively large area thus producing high frictional capacity without sacrificing the easy release feature.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a follower-acting member provided with friction surfaces; of a main spring resistance; a plurality of longitudinally movable friction plungers, each cooperable with one of said friction surfaces; friction elements, one for and cooperable with each plunger and opposed to the friction surface with which the plunger cooperates, said friction elements having wedge faces; wedge shoulders on said member cooperable with the wedge faces of said elements; and relatively light capacity spring means cooperable with said friction elements normally tending to force the latter along the wedge shoulders to frictionally grip the plungers.

2. In a friction shock absorbing mechanism, the combination with a hollow friction shell having a pair of opposed longitudinally extending friction surfaces on the inner side thereof, one on each side of the center line; of a main spring resistance; a pair of longitudinally movable friction plungers, one on each side of the center line and each engaging with a friction surface of the shell; a pair of friction gripping elements interposed between said plungers and each cooperable with a plunger, each of said elements having a wedge face; wedge shoulders on said friction shell cooperable with the wedge faces of said elements, said wedge shoulders and faces diverging inwardly of the shell; and spring means cooperable with said friction gripping elements normally tending to force the latter inwardly of the shell to maintain them in frictional contact with the plungers.

3. In a friction shock absorbing mechanism, the combination with a friction shell casting having interior longitudinally extending friction surfaces on opposite sides of the center line thereof, said shell being provided also with a centrally located partition extending at right angles to the said friction surfaces; of a main spring resistance; a plurality of plungers frictionally cooperable with said friction surfaces of the shell; wedge-friction elements cooperable with said plungers and located between the latter; a spring cooperable with said wedge-friction elements; a spring follower engaging the outer end of said last named spring; and a retainer bolt extending between said follower and anchored to said partition.

4. In a friction shock absorbing mechanism, the combination with a hollow friction shell having opposed longitudinally extending friction surfaces on the interior thereof on opposite sides of the center line; of a pair of plungers frictionally cooperable with said shell friction surfaces; a main spring resistance yieldingly resisting relative movement between said plungers and the shell; a pair of friction gripping elements interposed between said plungers, said elements and shell having cooperable wedge faces diverging inwardly of the shell; and a spring common to both of said friction gripping elements normally tending to move the latter inwardly long the wedge faces.

5. In a friction shock absorbing mechanism, the combination with a follower-acting member provided with friction surfaces; of a main spring resistance; a plurality of longitudinally movable friction plungers, each cooperable with one of said friction surfaces; friction elements, one for and cooperable with each plunger and opposed to the friction surface with which the plunger cooperates, said friction elements having wedge faces; wedge shoulders on said member cooperable with the wedge faces of said elements; relatively light capacity spring means cooperable with said friction elements normally tending to force the latter along the wedge shoulders to frictionally grip the plungers; and cooperable shoulders on said plunger and the follower-acting member limiting the outward movement of the plungers with respect to the follower-acting member.

6. In a friction shock absorbing mechanism, the combination with a casting having a friction shell at one end thereof and an internally formed spring cage, said shell having interior longitudinally extending friction surfaces on the opposite sides thereof; a main spring resistance within the spring cage; a pair of friction plungers on opposite sides of the center line and each cooperable with a shell friction surface; a main spring follower interposed between said main spring resistance and the inner ends of the plungers; a pair of friction gripping elements located between the plungers and each cooperable with a plunger, said elements and shell having cooperable wedge faces diverging inwardly of the shell; and spring means cooperable with said elements normally tending to move the latter inwardly of the shell.

7. In a friction shock absorbing mechanism, the combination with a casting having a friction shell at one end thereof and an integrally formed spring cage, said shell having interior longitudinally extending friction surfaces, on the opposite sides thereof; a main spring resistance within the spring cage; a pair of friction plungers on opposite sides of the center line and each cooperable with a shell friction surface; a main spring follower interposed between said main spring resistance and the inner ends of the plungers; a pair of friction gripping elements located between the plungers and each cooperable with a plunger, said elements and the shell having cooperable wedge faces diverging inwardly of the shell; and spring means cooperable with said elements normally tending to move the latter inwardly of the shell, said spring means being housed within said elements and having an outer follower cooperable therewith anchored to the casting.

In witness that I claim the foregoing I have hereunto subscribed my name this 28th day of Oct., 1921.

JOHN F. O'CONNOR.

Witnesses:
UNA C. GRIGSBY,
ANN BAKER.